INVENTORS
GABRIEL D. BOEHLER
WILLIAM F. FOSHAG
ATTORNEY

Dec. 13, 1966  W. F. FOSHAG ET AL  3,291,236
GROUND EFFECT MACHINE
Filed Oct. 12, 1961  9 Sheets-Sheet 6

INVENTORS
GABRIEL D. BOEHLER
WILLIAM F. FOSHAG
BY Russell, Chittick & Pfund
ATTORNEY Dec. 13, 1966  W. F. FOSHAG ET AL  3,291,236
GROUND EFFECT MACHINE Filed Oct. 12, 1961  9 Sheets-Sheet 7

INVENTORS
GABRIEL D. BOEHLER
WILLIAM F. FOSHAG

BY Russell, Chittick & Pfund
ATTORNEY

FIG. 18

United States Patent Office 3,291,236
Patented Dec. 13, 1966

3,291,236
GROUND EFFECT MACHINE
William F. Foshag, Westmorland, Md., and Gabriel D. Boehler, Washington, D.C., assignors to Aerophysics Company, Washington, D.C., a corporation of the District of Columbia
Filed Oct. 12, 1961, Ser. No. 144,777
13 Claims. (Cl. 180—7)

This invention relates generally to ground-effect machines (GEM) and more particularly to an improved high efficiency GEM having high pay load capability in a wide variety of environmental conditions including the capability of amphibious use for landing men and material on a beach from a ship standing off shore. While the GEM herein disclosed is particularly adapted for the fulfillment of an amphibious mission, it will be understood that various features herein disclosed and claimed will be of general utility in machines of this type and not limited to the particular embodiment herein disclosed.

The ground-effect machine can be defined as a vehicle which is supported without mechanical contact with the ground in spaced relation to the surface of the earth over which is travels where the support is provided by a relatively low pressure air cushion between the under surface of the vehicle and the subtended surface of the earth. As so defined a ground-effect machine is distinguishable from a ducted fan vehicle or similar flying machines capable of developing sufficient downward thrust to support the gross weight of the machine, operator and whatever cargo the device may be capable of carrying. The ground-effect machine, on the other hand, develops a low pressure air cushion for supporting the machine by remaining in close proximity to the surface of the earth. The cushion is developed within the confines of a downwardly directed annular curtain of air derived from a peripheral nozzle extending around the under surface of the machine to confine the low pressure air cushion without actually restraining the machine by mechanical contact with the ground. Since the air from the peripheral nozzle is relied upon to confine the air cushion as well as supply the air at low pressure within the cushion, the altitude above the surface of the earth at which such machines operate is limited due to the additional power required to be put into the annular air jet in order to maintain its efficiency as the altitude of the machine increases. When operating within such altitude limitations, however, the ground-effect machine enjoys a vast superiority in load carrying capability for a given power rating over conventional vertical thrust devices and hence is capable of offering a much more attractive payload possibility while retaining the maneuverability and freedom to traverse rough terrain characteristics of more conventional flying machines.

It is accordingly the primary object of the present invention to provide an improved ground-effect machine employing a centrifugal fan having a vertical axis of rotation.

A further object of the invention is to provide an improved ground-effect machine employing vertical axis centrifugal fans and having simplified air intake and ducting to a peripheral nozzle for providing efficient aerodynamic performance through a large speed range of the fan.

Another object of the invention is to provide elongated nozzles in the form of slots in the bottom surface of the ground-effect machine for producing inherent stability and to divide the area under the machine into independent air cushions for the purpose of control.

A further object is to provide an improved control arrangement for ground-effect machines including individually or in combination guide vanes, air volume control by means of throttling, multiple air cushions under the machine and adjustable direction propellers for producing control as well as propulsion.

An additional object of the present invention is to provide a ground-effect machine with improved pneumatic landing gear capable of absorbing the landing loads encountered in supporting the machine or uneven terrain and providing buoyancy when the machine lands in the water.

Another object is to provide means for inflating or retracting the pneumatic gear either selectively or automatically during flight.

Another object of the invention is to provide a ground-effect machine adapted for amphibious use and capable of absorbing the dynamic loads of traveling through the surf while airborne.

Another object of the invention is to provide independent air cushions under the surface of the machine for providing stability as well as lift forces for supporting the machine and means for controlling the relative lift of the cushions.

A still further object of the invention is to provide an improved ground-effect machine duct system having ram air inlets to supply a horizontal central intake for a rotary diffuser fan, the outlet of the rotary diffuser being a peripheral opening for supplying a horizontal plenum chamber which communicates with the peripheral nozzle in the under surface of the machine.

These and other objects of the invention will become apparent from the following detailed description taken in conjunction with the accompanying drawings wherein.

Figure 1:
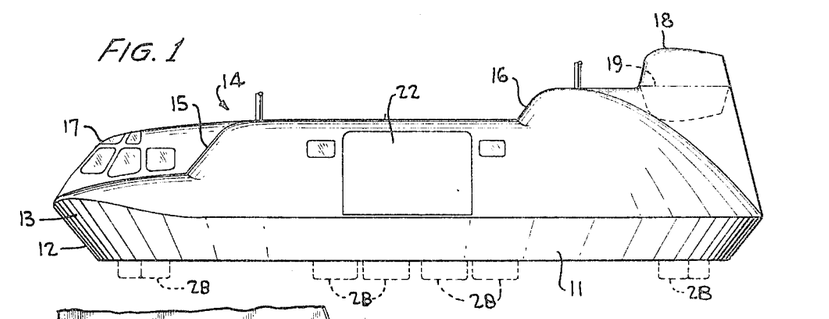
FIG. 1 is a view in side elevation of a ground-effect machine, in accordance with the invention.

Referring now to FIG. 1, the overall outline of the ground-effect machine of the present invention is made up of outwardly diverging side walls 11, which taper upwardly from the base to a prow 12 and the bow portion 13. The primary consideration for the shape of the bow 13 and the prow 12 is for absorbing hydrodynamic loads when the craft is plunging through the surf while airborne. For open water use, the height of the bow portion 13 can be raised to accommodate the craft to travel through higher waves than encountered in amphibious use through the surf.

Above the hull portion made up of the sides 11, a generally streamlined body portion 14 completes an aerodynamic shape which minimizes drag and provides a measure of aerodynamic lift during forward translation. A substantial portion of the projected frontal area of the craft above the line of side walls 11 is taken up by a fore ram air inlet 15 and a vertically offset aft ram air inlet 16. These air inlets 15 and 16 are bifurcated as is apparent from the view in FIG. 2, the forward areas 15 being disposed on opposite sides of a centrally located cockpit cabin 17 and the aft air intakes 16 being separated by the portion of the body to which the rear propeller is mounted. A vertical stabilizer 18 is provided in conventional form with the added feature of being pivoted about a horizontal axis 19 whereby the stabilizer 18 can be folded down as indicated for storage of the vehicle in minimum space.

Beneath the vehicle are located a plurality of pneumatic bags 28 which are distributed over the undersurface in a manner to support the weight of the machine. The inflation and deflation of these bags for use as landing gear or for additional flotation will be described hereinafter. A panel 22 of the side of the vehicle body wall is hinged about an axis at the bottom of the panel for lowering the panel 22 as a loading ramp extending from the craft.

Figure 2:
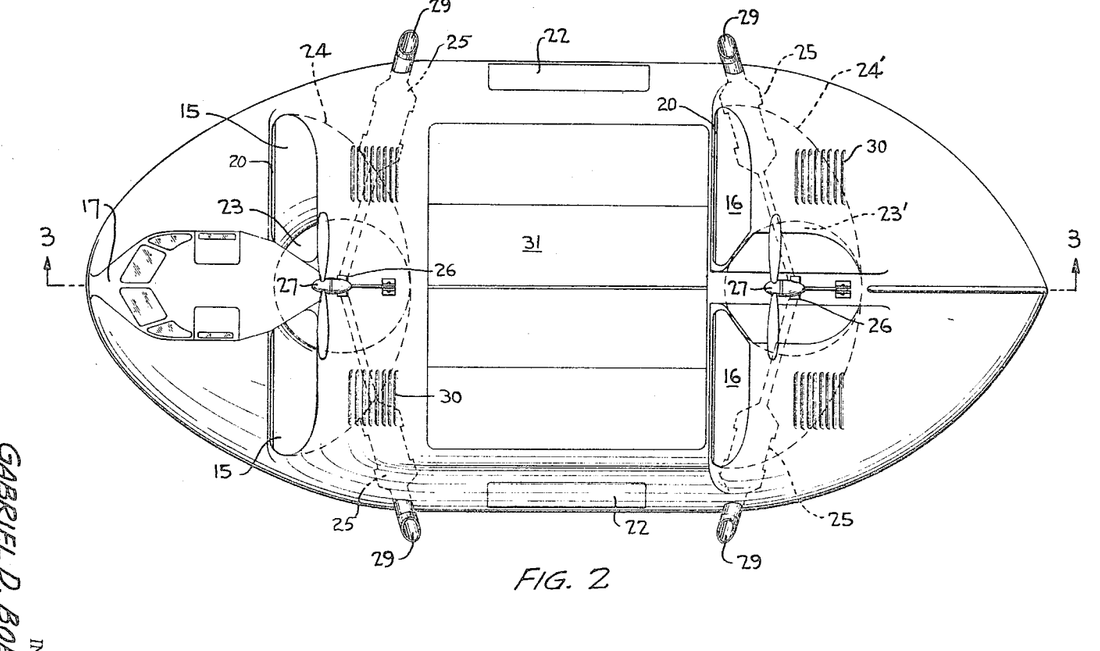
FIG. 2 is a top plan view of the machine.

Referring now to FIG. 2, additional features of the machine will be described. The air inlets 15 and 16 supply air to circular air intakes 23 and 23′ respectively which are directly above and co-extensive with the intake of the centrifugal fans used to support the machine. Between the inlets 15 and 16 and the respective intakes 23 and 23′ are converging duct walls 24 and 24′ which provide continuous air flow from the inlets 15 and 16 to the intakes 23 and 23′.

The machine is powered by four free turbine gas turbines 25 which drive through a suitable gear connection 26 the vertical axis fans beneath the openings 23 and the vertical shaft extending upwardly to drive thrust propeller units 27. The gas turbines 25 receive combustion air from the chamber in which they are located which is vented to the atmosphere through suitable louvers 30. Additional engine air is drawn through suction slots 20 into the engine plenum chambers. The slots 20 also ingest water passing over the craft and the engine plenums are provided with suitable openings for draining the accumulated water overboard. The turbine exhaust is directed through the wall of the vehicle by way of ports 29. A panelled top loading hatch 31 is provided which when opened exposes substantially the entire cargo area of the craft.

Figure 3:
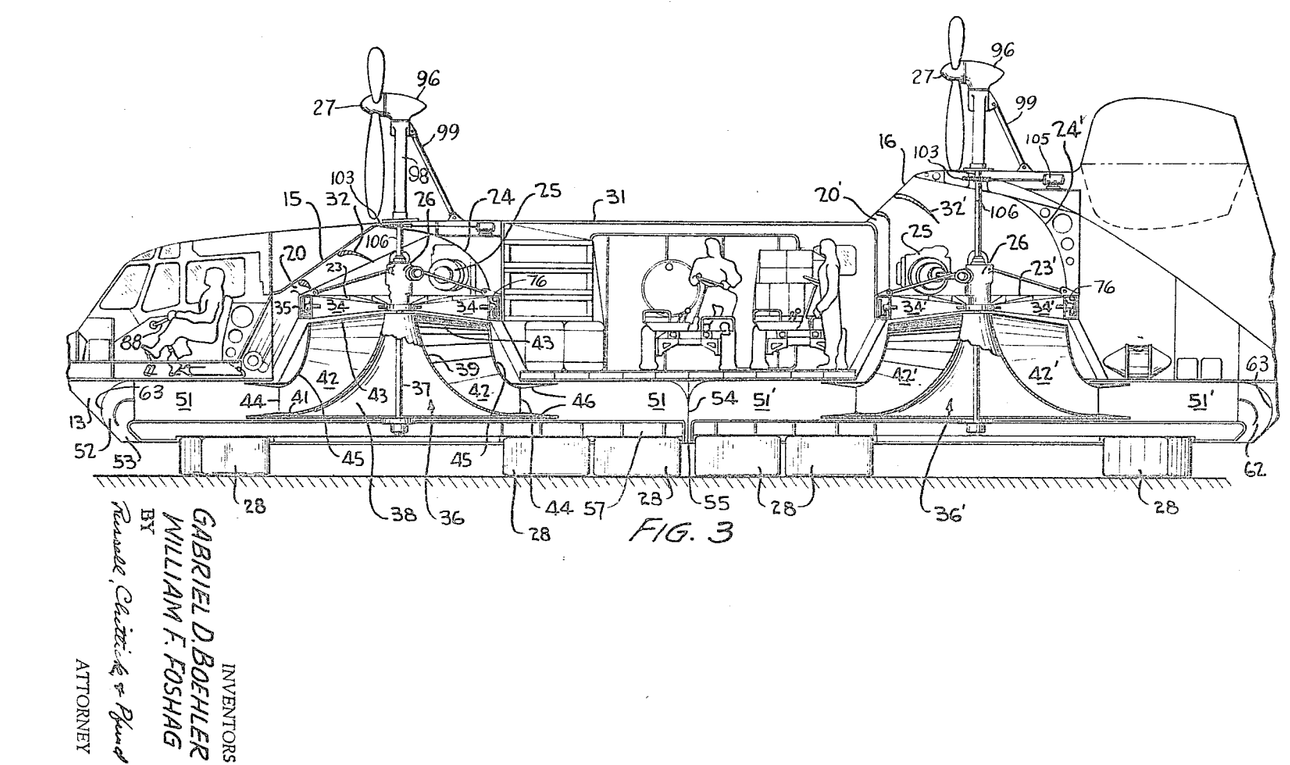
FIG. 3 is an inboard profile corresponding generally with a sectional view taken along the line 3—3 of FIG. 2.

Referring now to FIG. 3 the construction and aerodynamic features of the machine will be described. As shown the forward ram air intake 15 communicates by the converging duct 24 with the horizontal circular opening 23 and hence accelerates intake air through a first 90° turn. To assist the flow through this 90° turn, a turning vane 32 is located at an intermediate position just behind the inlet 15. The circular opening 23 contains a series of radial vanes 34 which are supported for rotation about horizontal radial axes from a full-closed to a full-open position. This rotation is accomplished by a crank arm extension 35 of each blade as will be hereinafter described. Directly beneath the set of vanes 34 is located a centrifugal fan 36 mounted for rotation on a vertical axis 37. The fan 36 is preferably a rotary diffuser type as manufactured by the Joy Manufacturing Company. The rotary diffuser fan 36 consists of a tapered hub 38 having a small substantially vertical-walled diameter portion 39 at the intake end of the fan and a large diameter substantially horizontal portion 41 at the exit region of the fan. Continuously secured along the surface of the hub 38 are a plurality of blades 42. The blades 42 have an impeller shaped leading edge 43 which gradually curves into vertical portions which extend down to a peripheral exit edge 44. The outer edge of the blades 42 is covered by a shroud 45 which defines with the surface of the hub 38 an air passage which conducts the air through a right angle turn from the inlet opening formed by the shroud 45 and the upper end of the hub 39 to the peripheral exit opening formed by the lower portion of the shroud 45 and the horizontal portion 41 of the hub. Attached to the fan and rotating therewith is a vaneless diffuser 46 which has interior diverging walls for decelerating the flow into a plenum chamber 51.

The plenum 51 is a chamber substantially airtight and completely surrounding the periphery of the exit opening of the fan formed by the diffuser 46 and extending outwardly to the boundary of the machine to feed air from the plenum 51 through a turn duct 52 into a converging passageway to the peripheral nozzle 53 of the machine. The plenum chamber 51 is terminated at the mid-point of the machine by a transverse wall 54 which extends through a transverse slot 55 extending across the under surface of the machine.

If desired, additional control vanes can be located around the periphery of the exit opening of the fans 36, said vanes being moveable as hereinafter described.

Beneath the plenum chamber 51 suitable space exists for the installation of fuel cells 57. On the under surface of the machine the plurality of pneumatic bags 28 are arranged for inflation and contraction as the landing gear and auxiliary flotation capacity for the craft.

The aft ram air intakes 16 communicate with aerodynamic structures generally equivalent to those described with the forward air intake 15. These components will not be described in detail but are numbered with correspondingly primed numbers and the description of these components given for the forward fan apply equally well for the aft fan. In general the direction of rotation of the aft fan will be opposite that of the forward fan to cancel the reaction torque of the fans.

Figure 4:
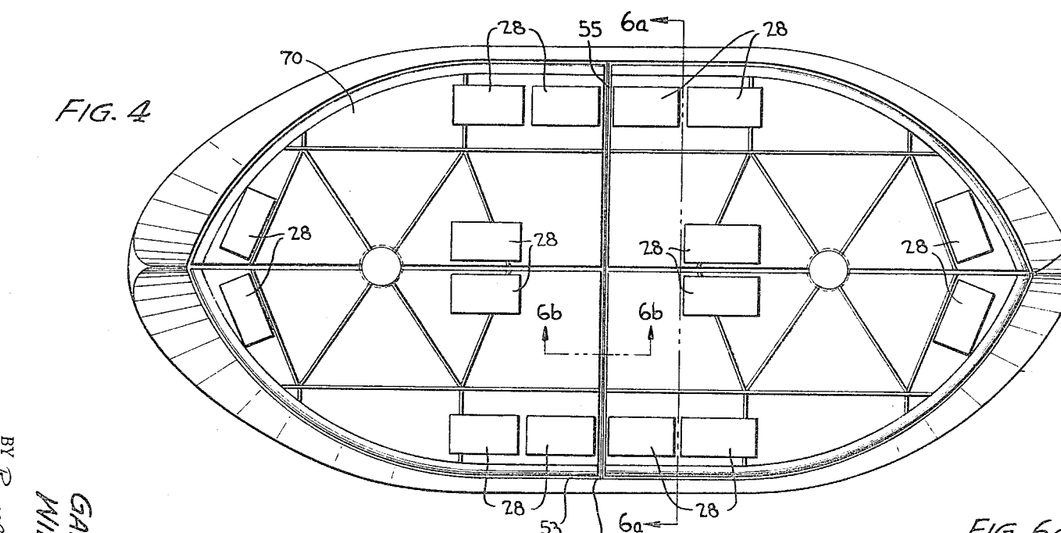
FIG. 4 is a plan view of the under surface of the machine when viewed from below with the lower surface skin removed exposing structure.

Referring now to FIG. 4, the under surface of the craft is shown which contains the peripheral nozzle 53 extending around the entire perimeter of the undersurface of the craft. This nozzle 53 discharges downwardly to provide the annular air jet which confines the air cushions which support the craft. The peripheral nozzle 53 is divided into a fore and aft section by the transverse wall 54 extending through the center of transverse slot 55. The slot 55 communicates with plenums 51 and 51′ on opposite sides of the wall 54 and hence serves to form a transverse jet for separating the fore and aft air cushions and providing pitch stability. The bags 28 are distributed over the bottom of the craft as shown to distribute landing loads to the structural members of the machine. When the bags 28 are retracted they have a bottom surface which is flush with the under skin cover 70 for the craft to provide a smooth continuous aerodynamic surface. A longitudinal slot 61 extends the entire length of the craft within the confines of the peripheral nozzle 53 and is separated at its mid-point by the wall 54. The slot 61 delivers a longitudinal jet of air from the plenum chambers 51 and 51′ to provide roll stability.

Figures 5, 16:
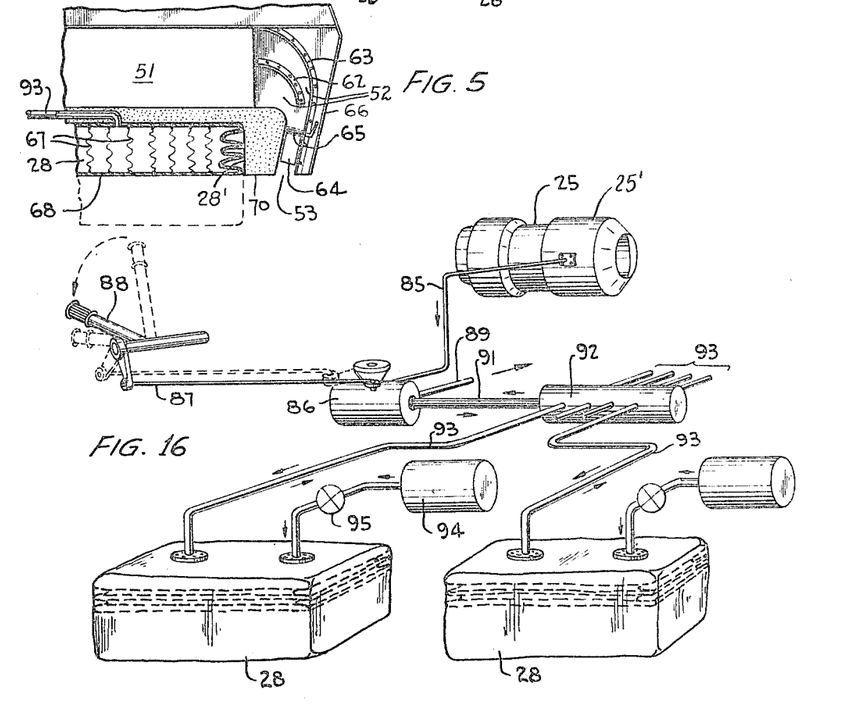
FIG. 5 is a fragmentary sectional view taken through the peripheral nozzle portion of the machine.
FIG. 16 is a perspective layout of a control system for the pneumatic landing bag system.
Figure 6A:
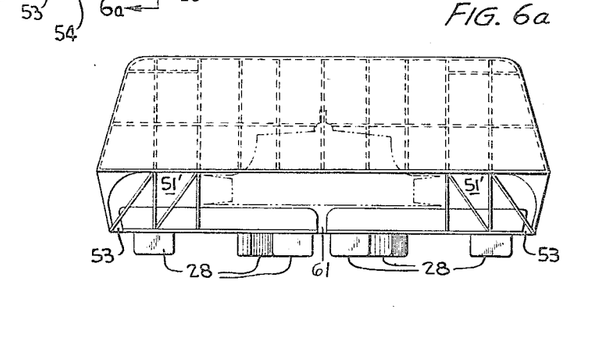
FIG. 6a is a sectional view of the machine taken along the lines 6a—6a of FIG. 4.

In FIG. 6a a transverse sectional view shows the general shape of the plenum chamber 51′ for delivering air to the peripheral nozzle 53. As shown, the direction of the jet from the nozzle 53 may be directed inwardly. The preferred form for this structure is shown in FIG. 5 to include a corner fairing 63 and an intermediate turning vane 62 which aid in the right angle turn of the air flow. The passage is arranged in conjunction with the fairing 63 to provide a converging duct to the nozzle 53. The air from the plenums 51 and 51′ is thus accelerated before it exits the nozzle 53.

Within the nozzle 53 a plurality of guide vanes 64 may be provided supported for rotation on a shaft 65 which extends to connect to an actuator arm for changing the position of the vanes 64 for deflecting the stream ejected from the nozzle 53 either forwardly or readwardly relative to the machine. The deflection of the jet afforded by the vanes 64 provides an independent component of force which augments or supplements the translational forces controlling the machine. The linkage for actuation of the arms 66 may be of any conventional type.

Figure 6B:
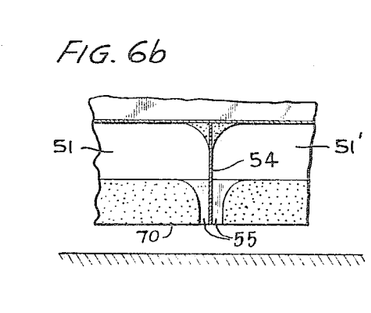
FIG. 6b is a sectional view on the line 6b—6b of FIG. 4.

FIG. 6b shows the detail of transverse wall 54 which divides the slot 55 and separates the fore and aft plenums 51 and 51'.

FIG. 5 also shows the detail of a landing bag 28. The bag 28 is made of an airtight rubberized fabric and is constrained by an internal string network 67 so that when inflated it will retain a substantially rectilinear shape. A scuff-resistant undersurface 68 is provided to withstand the abrasion of the craft landing on rough terrain or with a small translational component of motion. As previously indicated the surface 68 when the bag is retracted is flush with the contour of the undersurface skin 70 of the craft. As is shown for instance in FIGURE 5, the bags 28 are housed in recesses 28' in the undersurface 70 and may be partially evacuated, as shown in full lines, to be retracted and maintained within said recesses so that the bottom of undersurface 68 of each bag is maintained within the recess so as not to project below the level of the undersurface 70 of the craft. Means for thus evacuating the bags as well as for inflating and causing them to project from the recesses 28, as shown in broken lines in FIGURE 5, is described in detail hereinafter.

Figure 7:
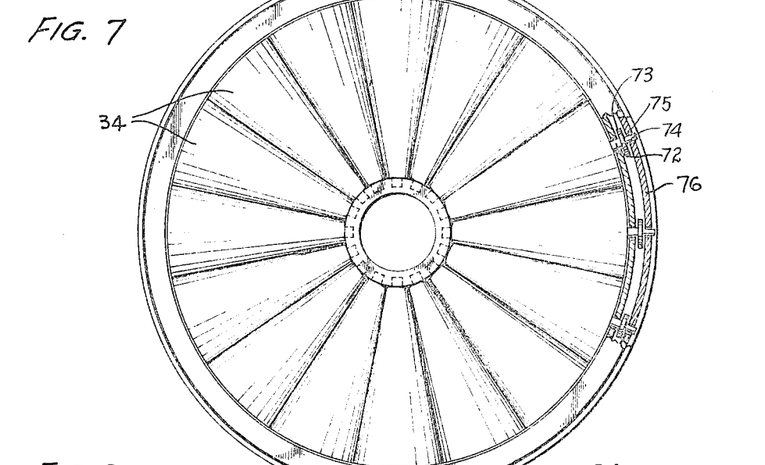
FIG. 7 is a plan view of throttle vanes over the central air inlet of a centrifugal fan partly in section to show control mechanism.
Figures 8, 9:
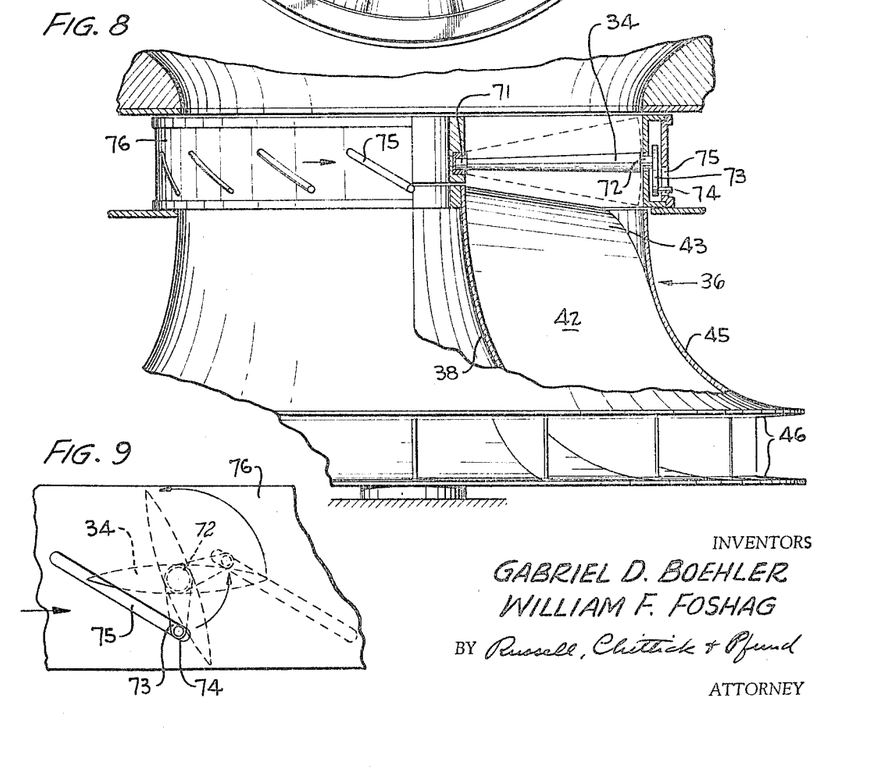
FIG. 8 is a fragmentary elevational view of the centrifugal fan and throttle vane control structure shown partly in section.
FIG. 9 is a fragmentary view of one throttle vane and the control ring linkage therefor for moving the vane to alternate positions.

Referring to FIGS. 7, 8, and 9, the control mechanism for rotating the throttling blades 34 will be described. The blades 34 are mounted with stud shaft extensions 71 and 72 to rotatably support the blade 34 on a horizontal axis. The shaft 72 is connected to a crank arm 73 which has a cylindrical extension 74 projecting through an inclined cam slot 75 in a control ring 76. The ring 76 is mounted for rotation relative to the assembly of blades 34 in a manner which permits the cam surface defining slots 75 to move the cylindrical extension 74 from a lower position to a position in the upper part of the slot 75. This action of the ring 76 in camming the blade 34 from a fully closed horizontal position to a fully open vertical position is indicated in FIG. 9 where the alternate positions of the slot crank cam extension 74 and blade 34 are indicated in dashed lines. By means of controlling the position of the ring 76 between the extremes where the cylindrical actuator 74 is in the opposite ends of the slot 75 a throttling of the air to the intake of the fan 36 may be obtained and by controlling the rings 76 for the fore and aft fans independently the amount of air delivered by each fan may be controlled to provide independent control of the air cushions under the machine.

Figure 10:
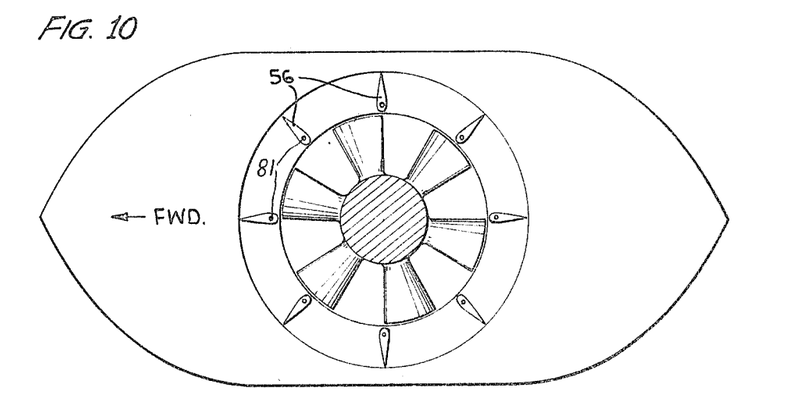
FIGS. 10–13 inclusive are views of fan exit control vanes shown in schematic form.
Figure 11:
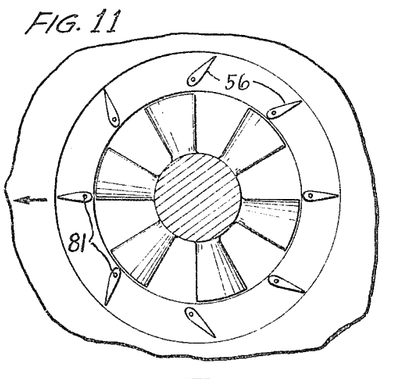
Figure 12:
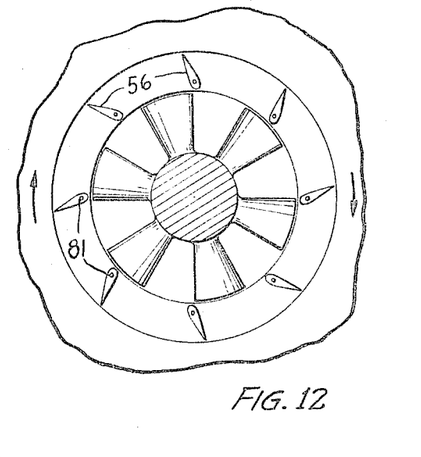
Figure 13:
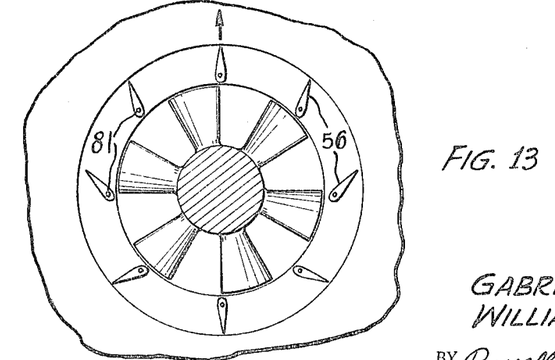

Referring to FIGS. 10 thru 13 one possible arrangement for obtaining the adjustable settings for a set of blades 56 surrounding the peripheral exit opening of the fans is shown. By controlling the vanes 56 in the manner hereinafter described, the pressure distribution to the annular nozzle may be modified in a manner to provide control forces for the machine. These control forces may be longitudinal or transverse translational forces as indicated in FIGS. 11 and 13 respectively, or may provide a control couple as indicated in FIG. 12. This structure and the controls for the blades 56 are not shown in FIG. 3, but their installation as described herein would be readily accomplished by those skilled in the art.

Figures 14, 15:
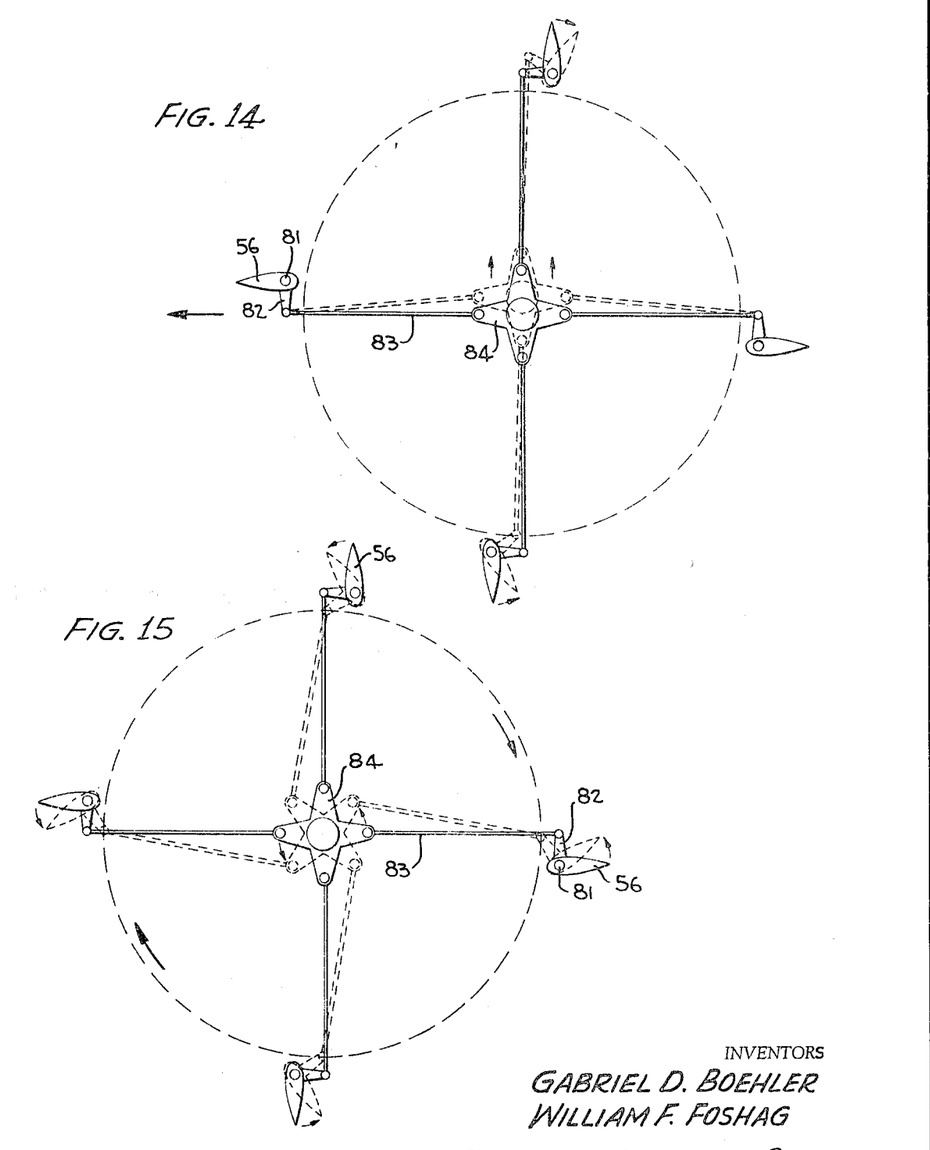
FIGS. 14 and 15 show one arrangement for controlling the position of the fan exit control vanes of FIGS. 10–13.

In the arrangement for controlling the blades 56 indicated in FIGS. 14 and 15 only four blades are shown. Each blade 56 is mounted for rotation about a vertical axis 81 with the position of the blade controlled by an arm extension 82 connected by a tie rod 83 to a star wheel 84. Translation of the star wheel 84 along a direction corresponding to oppositely extending rods 83 produces like deflection in the same direction of a diametrically opposite pair of blades 56 without substantially deflecting the remaining pair of blades, as indicated in FIG. 14. Rotation of the star wheel 84 produces a deflection of all of the blades in the assembly by rotation in the same direction as indicated in FIG. 15. This arrangement may be extended to any number of blades by using an appropriately multi-pointed star wheel 84. A combination of rotation and translation of the star hub 84 will provide control of the blades intermediate that indicated in FIGS. 14 and 15. The desired motion may be transmitted to the star hub 34 by any suitable control linkage.

Referring now to FIG. 16 an integrated control for the inflation and retraction of the pneumatic landing bags 28 will be described. A pressure bleed line 85 from the compressor 25' on the turbines 25 supplies actuating air pressure to a control valve 86. The valve 86 is operated by a suitable linkage 87 to the lift control lever 88 in the cockpit of the ground-effect machine in order that the bags 28 may be automatically inflated when the craft is landing and automatically retracted when the craft lifts off the ground. The valve 86 is a three-way valve having a second inlet 89 which is supplied from a vacuum source auxiliary pump (not shown) to supply the retraction force for the bags 28.

Depending upon the control position of the actuating rod 87, the valve 86 supplies positive or negative pressure on line 91 to a manifold 92 from which lines 93 extend to each of the pneumatic bags 28 in the landing gear system. The bags 28 are accordingly inflated or retracted to flight position depending upon whether pressure is supplied in the line 93 or vacuum is drawn therein. As an emergency measure in the event of power failure, a supply of compressed gas 94 is provided for each bag 28 and an emergency control valve 95 suitably actuated to inflate the bags 28 when required in the absence of air pressure supply in the line 85.

The bags 28 maintain the vehicle spaced from the ground after landing which aids in developing the airflow required for take-off.

Figure 17:
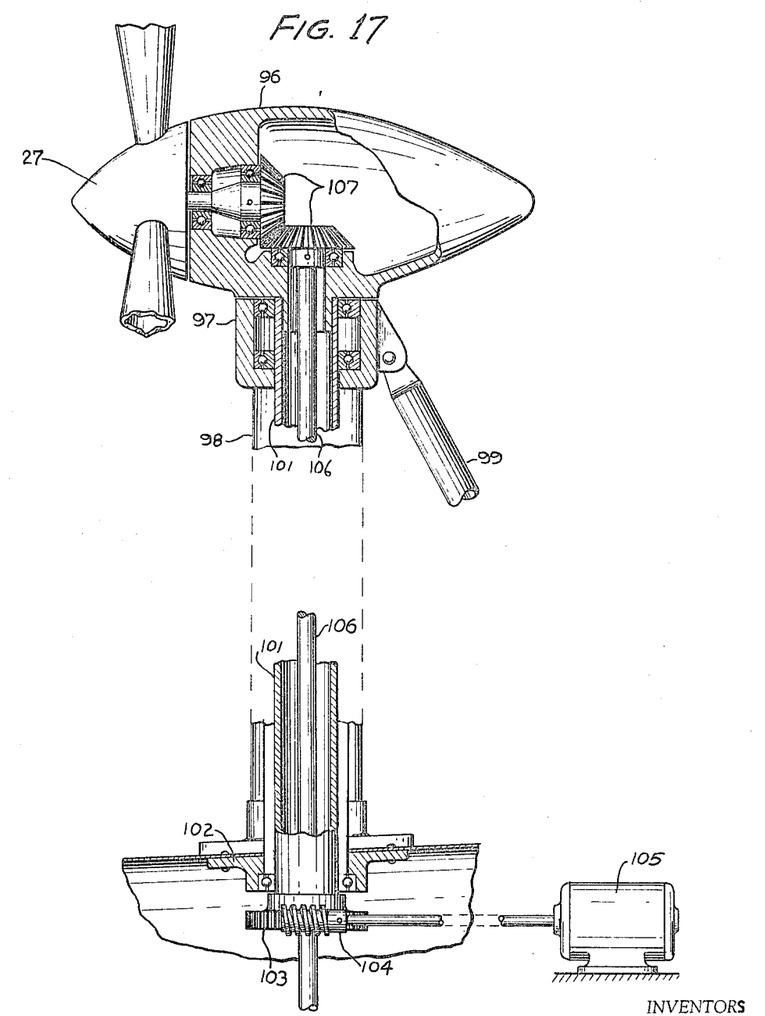
FIG. 17 is a side sectional view of a rotatable propeller pylon for the machine.

Referring now to FIG. 17, the arrangement for each propulsion unit of the machine is shown. The propeller hub 27 is journaled on a rotatable head 96 for providing propulsion or control thrust in any direction throughout a full 360° of azimuth. For this purpose the head 96 is journaled in a base 97 on the end of a support pylon 98 which is braced by one or more rods 99.

The rotatable mounting member for the head 96 is actually the upper end of a torque tube 101 which extends upwardly from a base 102 in which it is journaled. The lower end of the tube 101 is secured to a worm wheel 103 which is driven by a worm 104. The worm 104 can be selectively driven in either direction upon energizing an electric motor 105 by means of controls, not shown.

The propulsion hub 27 is supplied propulsion power through a shaft 106 concentric within the tube 101. The shaft 106 is coupled through bevel gears 107 to drive the hub 27 from which propeller blades extend. Power is supplied to the shaft 106 by a suitable coupling to the gear box 26.

The present invention utilizes a rotory diffuser fan 36 driven by gas turbine power plants to provide optimum operation over the entire speed range of the fans. This performance characteristic is essential to operations throughout the desired speed range with good fuel economy and furthermore permits operational flexibility since the gas turbine is capable of delivering optimum power as required by the fan irrespective of the speed of the fan. This combination of power producer and load thus results in the available shaft horsepower being equal to the absorbed shaft horsepower over the entire operating speed range so that the machine does not have to be designed with a specific operating point for the rotational speed of the fans. Being free from the requirement of a specific design point greatly enhances the utility and reliability of the combination and provides a turbine-fan characteristic which permits the machine to recover from such adverse operating conditions as direct water impact on the impeller blades of the fan with the resultant slowing of the rotational speed thereof while the lift requirement of the machine calls for sustained power output in the form of air delivered into the plenum chambers.

Figure 18:
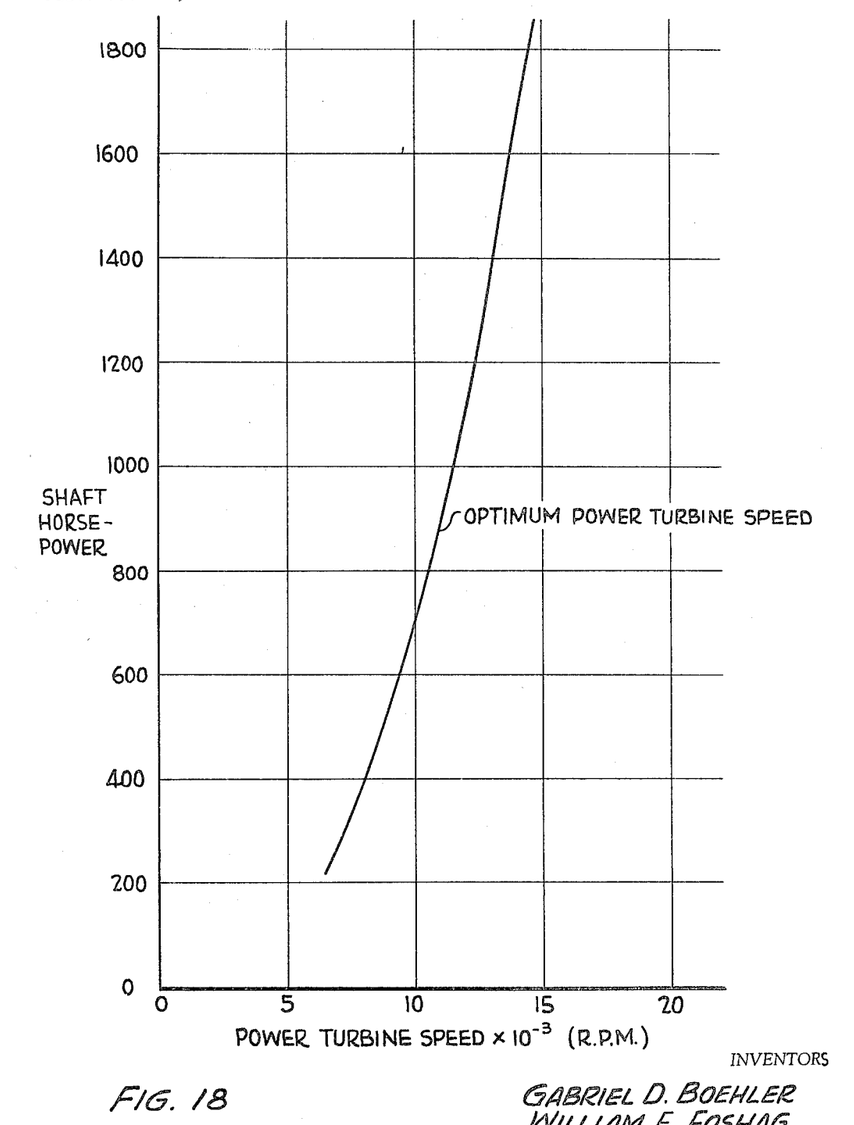
FIG. 18 is a curve plotting absorbed and available horsepower versus rotational speed for a rotary diffuser fan and a gas turbine.

A representation of the foregoing characteristic of the combination of turbine and fan is illustrated in FIG. 18 which is a plot of the available and absorbed horsepower versus rotational speed for a particular gas turbine and rotary diffuser fan. The data for FIG. 18 represent the combination of a Joy Manufacturing Company model RD123–70 rotary diffuser fan as disclosed in the Joy Manufacturing Co., bulletin J–618 entitled "Joy Rotating Diffuser Fans RD Series," driven by two Lycoming model TF2036 Marine gas turbines of the type disclosed in bulletin of Lycoming Div., Avco Corp., entitled "Lycoming Industrial and Marine Gas Turbine Engine, 'TF' and 'TC' series." This combination of equipment requires a gear stepdown of ratio of approximately 24 to 1 from the turbine to the fan and when so driven the optimum power characteristic as a function of turbine speed is substantially indistinguishable from the horsepower absorbed fan speed characteristic plotted to the same power and speed scales. This arrangement provides, as hereinbefore stated, improved stability over the operating speed range of the equipment as compared to the single design point normally encountered with axial flow fans as heretofore employed in ground-effect machines.

The various novel features and combinations disclosed herein will be recognized by those skilled in the art as providing improved operating characteristics for the ground-effect machine. Many variations of the features disclosed will also be apparent and these modifications whether used singly or in combination remain within the true spirit and scope of the present invention. The embodiment disclosed herein is accordingly to be considered as illustrative and not in limitation of the invention which is defined by the scope of the appended claims.

We claim:

1. A ground-effect machine comprising a body having a bottom surface containing a peripheral nozzle for the delivery of an annular jet of air to confine air under pressure to support said machine, a centrifugal fan having a rotor mounted for rotation on a substantially vertical axis, said rotor having a hub with a small diameter upper portion forming a substantially vertical walled cylindrical surface and flaring continuously to a large diameter lower portion with the surface of said lower portion substantially horizontal, a set of impeller blades each secured along one edge to said hub and having the opposed edge generally parallel to the contour of said hub, a flared shroud conforming to the contour of said opposed edges and attached thereto to form a central intake opening around said cylindrical surface and a peripheral exit opening between said shroud and the horizontal portion of said hub, said hub, shroud and blades forming a plurality of closed conduits between said central intake opening and said peripheral exit opening, conduit means for conducting air delivered from said peripheral exit opening to said peripheral nozzle, said shroud and the horizontal portion of the hub extending radially beyond the ends of the respective impeller blades and defining therearound an annular rotary diffuser at said exit opening, the maximum diameter of said shroud being no greater than that of said diffuser, and means for driving said rotor, said last-mentioned means including a rotary output member and gearing connecting said member in driving relation to said rotor, said last-mentioned means constituting the sole means for driving the fan.

2. A ground-effect machine comprising a body having a bottom surface containing a peripheral nozzle for the delivery of an annular jet of air to confine air under pressure to support said machine, a transverse slot bisecting said surface into fore and aft areas, vertically off-set fore and aft ram air inlets forwardly directed for entraining ram air during normal forward translation of said machine, fore and aft centrifugal fans each having an intake opening, a peripheral outlet, and a vertical axis of rotation, said fans being located to position said intake openings to receive air from said inlets respectively, each said fan having a rotor comprising a conical hub, a set of curved blades secured along one edge to said hub and a continuous shroud secure to the edges of said blades opposed to said hub, said hub, blades and shroud defining closed rotating conduits between the said intake opening and peripheral outlet of the fan comprised thereby, separate fore and aft plenum chambers surrounding said peripheral outlets respectively and communicating with the respective fore and aft portions of said peripheral nozzle on opposite sides of said slot, means for driving fans, and means for supplying air to be directed downwardly through said slot to divide the air cushion under said surface into independent air cushions under said fore and aft areas respectively.

3. Apparatus according to claim 2 in which the peripheral outlet of each of said fans is a rotary diffuser integral with the rotor of said fan.

4. A ground-effect machine comprising a body having a bottom surface containing a peripheral nozzle for the delivery of an annular jet of air to confine air under pressure to support said machine, vertically offset fore and aft ram air inlets forwardly directed for entraining ram air during normal forward translation of said machine, fore and aft vertical axis centrifugal fans each having a conical hub, a set of curved blades secured along one edge to said hub and a continuous shroud secured to the edges of said blades opposed to said hub, said hub, blades and shroud forming closed rotating conduits between central axial intakes and peripheral radial outlets at the opposite ends of said conduits, and vertical axes of rotation, said fans being located to position said intakes to receive air from said inlets respectively, a duct converging from each of said inlets to a respective one of said intakes, a plenum chamber surrounding each of said peripheral outlets and communicating with said peripheral nozzle, and means for driving said fans.

5. Apparatus according to claim 4 in which the peripheral outlet of each of said fans is a rotary diffuser integral with the rotor of said fan.

6. Apparatus according to claim 4 and including a set of vanes in each said plenum chamber mounted for angular adjustment about a horizontal axis, and means for selectively adjusting the angular position of said vanes.

7. A ground-effect machine comprising a body having a bottom surface containing a peripheral nozzle for the delivery of an annular jet of air to confine air under pressure to support said machine, a pair of horizontal plenum chambers in the lower portion of said body in communication with separate portions of said nozzle, a pair of centrifugal fans each having a central intake opening and a peripheral exit opening, said exit openings delivering air to said plenum chambers respectively, a duct for supplying air to each of said intake openings and including throttle means in each said duct, means for controlling each said throttle means, a set of vanes distributed around said exit opening in said chamber and mounted for angular adjustment about a horizontal axis, means for selectively adjusting the angular position of said vanes, a pair of propulsion propellers for producing horizontal thrust, said propellers being angularly adjustable about a vertical axis to change the direction of the thrust axes of said propellers, and means for controlling the angular position of each said thrust axis.

8. A ground-effect machine comprising a body having an aerodynamic under surface with a downwardly directed peripheral nozzle for the delivery of air to support the machine when airborne, a plurality of pneumatic bags normally housed in recesses distributed over said under surface of said body and inflatable to project downwardly out of said recesses and below said undersurface to distribute the landing loads over said body and support said machine on a landing surface with said under surface spaced from said landing surface, an air evacuating means connecting to said bags for retracting said bags into said recesses at least to the level of said undersurface, said bags located to permit air delivery from said nozzle when said machine is supported on said bags spaced from said landing surface to assist in developing air pressure cushions to support said machine.

9. A ground-effect machine comprising a body having a bottom surface containing a peripheral nozzle for the delivery of an annular jet of air to confine air under pressure to support said machine when airborne, a plurality of bags distributed over and recessed in said surface and adapted when retracted to form substantially a continuation of said surface, and means for inflating said bags to project downwardly from said surface for supporting said machine on a landing surface with said bottom surface spaced from said landing surface.

10. Apparatus according to claim 9 and including control means operable alternately to inflate and retract said bags.

11. Apparatus according to claim 10 in which said control means is operated in conjunction with flight controls for said machine to retract said bags after take-off and inflate said bags prior to landing.

12. A ground-effect machine comprising a body having a bottom surface containing a peripheral nozzle for the delivery of an annular jet of air to confine air under pressure to support said machine, a rotary diffuser centrifugal fan mounted for rotation on a vertical axis, said fan having shrouded blades forming closed conduits between a central air intake and a peripheral air outlet on said fan, an air inlet for supplying air to said intake, means for conducting air from said outlet to said peripheral nozzle, a gas turbine power plant, and a gear reduction connection said turbine and said fan to drive said fan at a speed lower than the speed of said turbine by the ratio of said gear reduction, the optimum power produced-rotational speed characteristic of said turbine matching the power absorbed-rotational speed characteristic of said fan over substantially the entire speed range of said fan when corrected for said ratio of said gear reduction.

13. A ground-effect machine comprising a body having an upper surface and a bottom surface containing a peripheral nozzle for the delivery of an annular jet of air to confine air under pressure to support said machine; means forming an air inlet in said upper surface; a centrifugal fan including blades having inner and outer shrouds forming an upward intake opening communicating with said inlet, said inner and outer shrouds defining a rotary diffuser around the outer periphery of said fan, the outer peripheries of said shrouds being coincident with and defining the outer periphery of the diffuser; conduit means surrounding the periphery of said rotary diffuser and communicating with said peripheral nozzle; said fan, shrouds and diffuser being integral and rotating on a substantially vertical axis of rotation for supplying air from said inlet to said conduit means to supply pressurized air to said nozzle; and means for driving said fan, shroud and diffuser, said fan having a rotary power input member, and said fan driving means comprising power drive means for said fan including a rotary output member and gearing operatively interconnecting said output and input members, said power drive means and gearing constituting the sole means for rotating said fan.

References Cited by the Examiner
UNITED STATES PATENTS

| | | | |
|---|---|---|---|
| D. 145,873 | 11/1946 | Nowak | 114—66.5 |
| 1,656,492 | 1/1928 | Moineau | 244—20 |
| 2,083,186 | 6/1937 | Anderson | 230—114 |
| 2,113,391 | 4/1938 | Bartlett et al. | 230—114 |
| 2,123,916 | 7/1938 | Rohrback | 244—20 |
| 2,341,974 | 2/1944 | Browne | 230—114 |
| 2,350,839 | 6/1944 | Szydlowski | 230—114 |
| 2,372,518 | 3/1945 | Robinson | 230—114 |
| 2,845,216 | 7/1958 | Sallou | 230—134.45 |
| 2,850,876 | 9/1958 | Wood | 230—116 |
| 2,984,200 | 5/1961 | Toussel | 114—67 X |
| 3,019,756 | 2/1962 | Murri | 180—7 |
| 3,039,550 | 6/1962 | Beardsley | 180—7 |
| 3,067,967 | 12/1962 | Barr | 180—7 |
| 3,162,260 | 12/1964 | Cockerell | 180—7 |
| 3,168,155 | 2/1965 | Cockerell | 180—7 |
| 3,170,529 | 2/1965 | Kelley et al. | 180—7 |
| 3,174,569 | 8/1965 | Eggington | 180—7 |
| 3,174,570 | 3/1965 | Cockerell | 180—7 |
| 3,174,572 | 3/1965 | Eggington et al. | 180—7 |

FOREIGN PATENTS

| | | |
|---|---|---|
| 219,133 | 11/1958 | Australia. |
| 1,073,881 | 3/1954 | France. |
| 1,240,721 | 8/1960 | France. |

OTHER REFERENCES

Publication: Design News; May 23, 1960; pages 6 and 7.

David Taylor Model Basin, Aero Report 966; page 7 relied on; September 1959.

David Taylor Model Basin, Aero Report 994; page 9 relied on; December 1960.

Publication: SAE Transaction No. 270A; Jan. 9–13, 1961; Fig. 10 relied on.

A. HARRY LEVY, *Primary Examiner.*